Sept. 30, 1930. W. ZEUG ET AL 1,777,243
LEAK PREVENTING ELEMENT FOR FIRE HYDRANT CAPS
Filed May 17, 1927
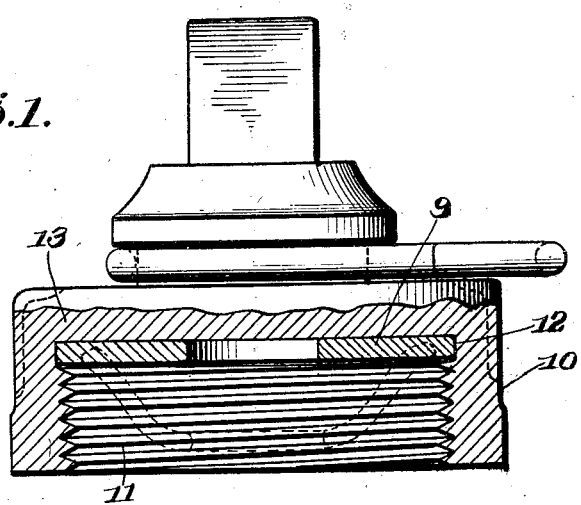
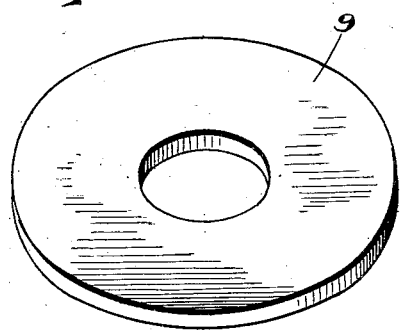
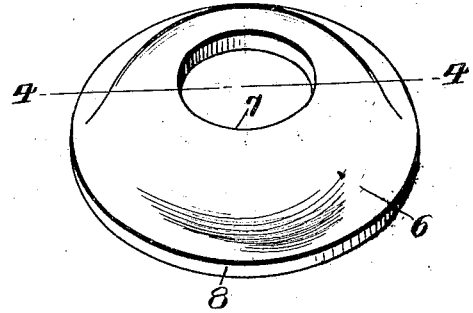
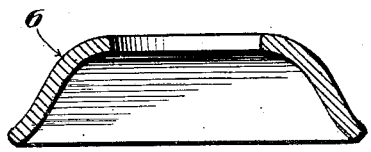
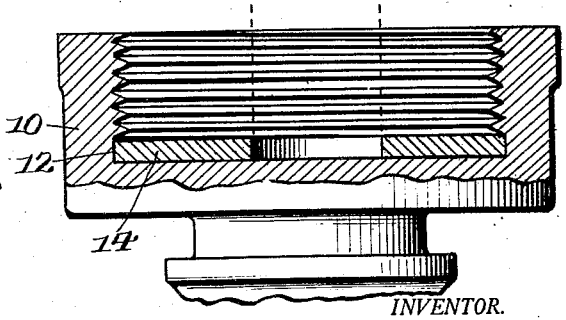
INVENTOR.
William Zeug and
BY Louis Grimm,
Geo. F. Kimmel ATTORNEY.

Patented Sept. 30, 1930

1,777,243

UNITED STATES PATENT OFFICE

WILLIAM ZEUG AND LOUIS GRIMM, OF MUSCATINE, IOWA

LEAK-PREVENTING ELEMENT FOR FIRE-HYDRANT CAPS

Application filed May 17, 1927. Serial No. 192,080.

This invention relates to a leak preventing element for caps of fire hydrants or plugs, and has for its object to provide, in a manner as hereinafter set forth, a cap of such class having permanent means arranged therein to prevent the leakage of water therethrough.

A further object of the invention is to provided, in a manner as hereinafter set forth, for use in a cap of the class referred to a permanent leak preventive means to overcome the employment of leather washers for such purpose, as is well known such type of washers quickly wear out and rot resulting in the constant replacing of such type of washers to prevent leakage of the cap.

Further objects of the invention are to provide a leakage preventing element for the caps of fire hydrants or plugs, in the manner as hereinafter set forth, and which is simple in its construction and arrangement, strong, durable, thoroughly efficient in its use, and comparatively inexpensive to assemble.

With the foregoing and other objects in view the invention consists in the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claim hereunto appended.

In the drawings wherein like reference characters denote corresponding parts throughout the several views:—

Figure 1 is a vertical sectional view of a non-leakage cap in accordance with this invention.

Figure 2 is a perspective view of the leak preventing element after it has been positioned within the cap body.

Figure 3 is a perspective view of the leak preventing element prior to the positioning thereof.

Figure 4 is a section on line 4—4 Figure 3.

Figure 5 is a cross sectional view illustrating a modified form of leak preventing element.

The leak preventing element is expandible and its normal outer diameter is less than the inner diameter of the part into which it is to be positioned to prevent leakage.

With reference to Figures 3 and 4 the leak preventing element is generally indicated at 6 and it consists of an inverted, cup-shaped, compressible hollow body of frusto-conical contour open at each end.

The element 6 is constructed throughout of soft metal, preferably lead and has the edge thereof at its smallest end indicated at 7 and the edge at its largest end at 8. In lengthwise section the element 6 extends outwardly from its smallest to its largest end and is upon a compound curve throughout, the curvature being such to form an inwardly extending portion at the smallest end to provide the opening at such end of a diameter materially less than the diameter at the largest end and to further provide a seat for a compressing tool for the purpose of expanding the element. When the element 6 is expanded to engage the inner face of the part with which it is associated, it will appear as a flat annulus as shown in Figures 1 and 2 and indicated at 9. When the element 6 is secured in position the edge 8 thereof snugly engages throughout the inner face of the cap body. The element 6 is wedgingly secured within the cap body and forms a permanent part thereof.

The body of the cap is indicated at 10, and has a portion of its inner face formed with threads 11 and the inner face of said body 10 has a portion thereof plane as indicated at 12 and said plane portion 12 is interposed between the inner ends of the threads 11 and the inner face of the top 13 of the body 10. The inner face of the top 13 is uninterrupted throughout. The edge 8 of the element 6, when the latter is wedgingly secured in position, abuts throughout the plane portion 12 of the inner face of the body 10. The element 6 is of a thickness corresponding to the width of the plane portion 12 of the body 10. The element 6 when secured in the cap body 10 forms a permanent part of the latter and acts to prevent leakage in a thoroughly effective manner, at the same time it overcomes the necessity for constantly replacing the leather washers employed in hydrant or plug caps to prevent leakage. The element 6 is expanded in any suitable manner to assume the form indicated at 9 and to wedgingly engage with the plane portion 12 of the cap body 10.

With reference to Figure 5 the leak preventing element within the cap body 10 is indicated at 14 and is set up by pouring molten lead into and molding the same in the cap body between the threads and top of the cap body at the plane portion 12 of the latter.

When the cap body is constructed in the manner as shown in Figures 1 and 5, it is provided with a permanent leak preventing element which is thoroughly efficient in its use, and therefore it is thought that the many advantages of a non-leakage cap for hydrants or plugs, in accordance with this invention, can be readily understood, and although the preferred embodiment of the invention is as illustrated and described, yet it is to be understood that changes in the details of construction can be had which fall within the scope of the invention as claimed.

What we claim is:

A leak preventing element for insertion into hydrant caps comprising a compressible, inverted, cup-shaped, hollow, expansible, soft metal body of frusto-conical contour open at each end, said body in lengthwise section extending outwardly from its smallest to its large end upon a compound curve throughout thereby providing an inwardly extending portion at the smallest end of said body, said body having its edge at the largest end thereof inclining away from the axis thereof.

In testimony whereof we affix our signatures hereto.

WILLIAM ZEUG.
LOUIS GRIMM.